(12) United States Patent
Kanenari (10) Patent No.: US 11,680,861 B2
(45) Date of Patent: Jun. 20, 2023

(54) TIRE INFORMATION ACQUISITION DEVICE HAVING A HEAT-INSULATING MATERIAL

(71) Applicant: The Yokohama Rubber Co., LTD., Tokyo (JP)

(72) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 49 days.

(21) Appl. No.: 17/251,162

(22) PCT Filed: May 9, 2019

(86) PCT No.: PCT/JP2019/018546
§ 371 (c)(1),
(2) Date: Dec. 10, 2020

(87) PCT Pub. No.: WO2020/012772
PCT Pub. Date: Jan. 16, 2020

(65) Prior Publication Data
US 2021/0255050 A1    Aug. 19, 2021

(30) Foreign Application Priority Data

Jul. 9, 2018 (JP) ................................. 2018-130068

(51) Int. Cl.
*G01L 17/00* (2006.01)
*B60C 19/00* (2006.01)
*B60C 23/04* (2006.01)
*G01L 19/00* (2006.01)

(52) U.S. Cl.
CPC .............. *G01L 17/00* (2013.01); *B60C 19/00* (2013.01); *B60C 23/04* (2013.01); *G01L 19/0092* (2013.01); *B60C 2019/004* (2013.01)

(58) Field of Classification Search
None
See application file for complete search history.

(56) References Cited

U.S. PATENT DOCUMENTS

| 7,347,088 B2 | 3/2008 | Shimura |  |
|---|---|---|---|
| 8,716,916 B2 * | 5/2014 | Nakatsuka | ............. H02N 1/004 310/40 MM |
| 8,803,401 B2 * | 8/2014 | Nakatsuka | ............... H02N 1/08 310/309 |
| 2002/0088517 A1 | 7/2002 | Shimura |  |

(Continued)

FOREIGN PATENT DOCUMENTS

| DE | 44 02 136 | 12/1997 |
| DE | 10 2009 008 350 | 9/2010 |

(Continued)

OTHER PUBLICATIONS

International Search Report for International Application No. PCT/JP2019/018546 dated Jun. 11, 2019, 3 pages, Japan.

*Primary Examiner* — Octavia Davis Hollington
*Assistant Examiner* — Jermaine L Jenkins
(74) *Attorney, Agent, or Firm* — Thorpe North & Western (57) ABSTRACT

Provided is a tire information acquisition device. A sensor unit substrate on which a sensor for acquiring tire information and a power supply unit for supplying electric power to the sensor are disposed is provided, and a heat-insulating material is disposed at at least a periphery of the power supply unit.

10 Claims, 6 Drawing Sheets

(56) References Cited

U.S. PATENT DOCUMENTS

| | | |
|---|---|---|
| 2007/0044552 A1 | 3/2007 | Huang |
| 2011/0043375 A1 | 2/2011 | Tanaka et al. |
| 2013/0241723 A1 | 9/2013 | Tanaka et al. |
| 2014/0343797 A1 | 11/2014 | Naito et al. |
| 2015/0328942 A1 | 11/2015 | Weston |

FOREIGN PATENT DOCUMENTS

| | | |
|---|---|---|
| JP | 2002-211222 | 7/2002 |
| JP | 2005-043096 | 2/2005 |
| JP | 2006-103124 | 4/2006 |
| JP | 2006-175914 | 7/2006 |
| JP | 2011-042288 | 3/2011 |
| JP | 2012-081701 | 4/2012 |
| JP | 2016-505438 | 2/2016 |
| JP | 6272225 | 1/2018 |
| WO | WO 2012/050035 | 4/2012 |
| WO | WO 2014/081409 | 5/2014 |

* cited by examiner

TIRE INFORMATION ACQUISITION DEVICE HAVING A HEAT-INSULATING MATERIAL

TECHNICAL FIELD

The present technology relates to a tire information acquisition device and particularly relates to a tire information acquisition device that, by disposing a heat-insulating material at a periphery of a power supply unit disposed on a sensor unit substrate, is capable of suppressing deterioration of the power supply unit and extending the service life of the power supply.

BACKGROUND ART

A tire information acquisition device including a sensor for acquiring information about the inside of a tire, such as internal pressure, temperature, and the like, is installed in a tire cavity (for example, see Japan Patent No. 6272225B and Japan Unexamined Patent Publication No. 2016-505438T).

Generally, there is a problem in that the power supply unit (battery) disposed on the sensor unit substrate is more likely to deteriorate as the temperature becomes lower or higher and the service life of the battery becomes shorter. In particular, a tire for a truck has an internal temperature of about 20° C. higher than that of a tire for a passenger car during traveling, so a tire information acquisition device mounted on the tire for a truck is often exposed to a high temperature. Therefore, a tire information acquisition device mounted on a tire for a truck has a problem in that the service life of the battery is easily shortened.

SUMMARY

The present technology provides a tire information acquisition device that, by disposing a heat-insulating material at a periphery of a power supply unit disposed on a sensor unit substrate, is capable of suppressing deterioration of the power supply unit and extending the service life of the power supply unit.

A tire information acquisition device includes a sensor unit substrate on which a sensor for acquiring tire information and a power supply unit for supplying electric power to the sensor are disposed, and a heat-insulating material is disposed at at least a periphery of the power supply unit.

In an embodiment of the present technology, a sensor unit substrate on which a sensor for acquiring tire information and a power supply unit for supplying electric power to the sensor are disposed is provided, and a heat-insulating material is disposed at at least a periphery of the power supply unit, so in the power supply unit, it is possible to suppress a temperature change due to heat generation of the tire during traveling and a decrease in the temperature outside the tire. Accordingly, the service life of the power supply unit that is easily affected by heat may be extended.

In the present technology, the sensor is preferably disposed outside the heat-insulating material. In a case in which the sensor unit substrate includes a sensor that measures the internal temperature of the tire, a temperature change inside the tire may be accurately detected by disposing the sensor outside the heat-insulating material.

In the present technology, it is preferable that the power supply unit includes an electret that generates electric power by changing a position of an electrode due to rotational movement or reciprocating movement. By employing a power generation method including an electret as the power supply unit, electric power may be efficiently supplied to the sensor.

In the present technology, the thermal conductivity of the heat-insulating material at 20° C. is preferably 0.05 [W/m·K] or less. This makes it possible to effectively suppress a temperature change of the portion covered with the heat-insulating material. The thermal conductivity of the heat-insulating material is measured according to the guarded hot plate method (GHP method) of JIS (Jpanaese Industrial Standard)-A1412. In a case in which the heat-insulating material is a composite body formed by combining a plurality of materials, the thermal conductivity of the heat-insulating material is the thermal conductivity of the composite body.

In the present technology, the heat-insulating material is preferably a composite body of an organic fiber and an inorganic porous material. As a result, the heat-insulating efficiency of the heat-insulating material is improved, so a temperature change may be suppressed with less heat-insulating material.

In the present technology, the heat-insulating material preferably has a structure in which silica aerogel is dispersed in polyester fiber. By the heat-insulating material having this kind of a structure, it is possible to reduce the thickness of the heat-insulating material while lowering the thermal conductivity of the heat-insulating material, so an excellent effect of suppressing temperature change may be obtained without increasing the dimensions of the heat-insulating material.

DETAILED DESCRIPTION

Figure 1:
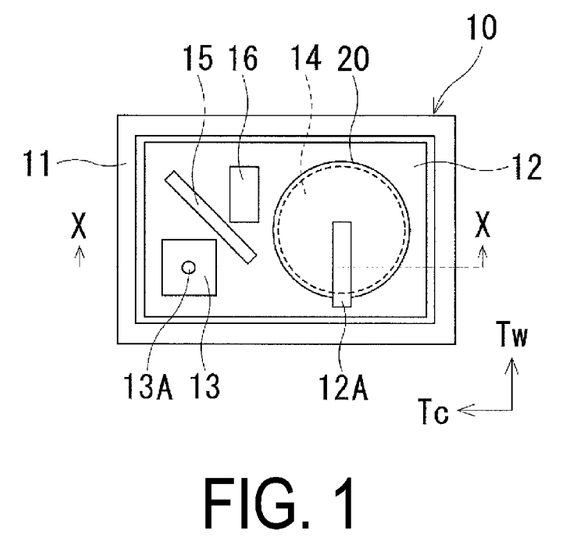
FIG. 1 is a plan view illustrating an example of an internal structure of a tire information acquisition device according to an embodiment of the present technology.
Figure 2:
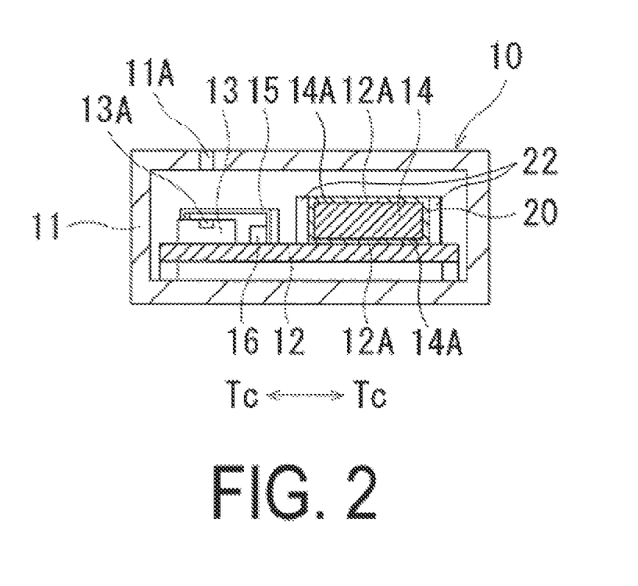
FIG. 2 is a sectional view taken along section line X-X in FIG. 1.
Figure 3:
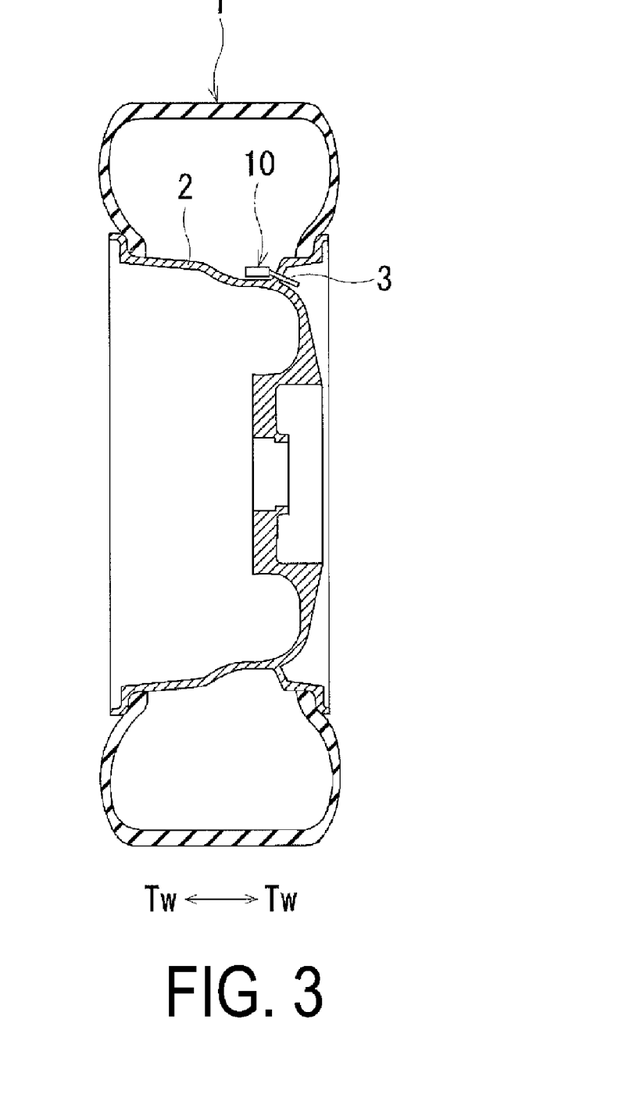
FIG. 3 is a cross-sectional view illustrating a pneumatic tire equipped with a tire information acquisition device according to an embodiment of the present technology.

Configurations of embodiments of the present technology will be described in detail below with reference to the accompanying drawings. FIGS. 1 and 2 illustrate a tire information acquisition device according to an embodiment of the present technology. FIG. 3 is a cross-sectional view illustrating a pneumatic tire equipped with a tire information acquisition device according to an embodiment of the present technology. Note that, in FIGS. 1 to 3, an arrow Tw indicates a tire width direction and an arrow Tc indicates a tire circumferential direction.

As illustrated in FIGS. 1 to 3, a tire cavity is formed between a pneumatic tire 1 and a wheel 2, and the tire information acquisition device 10 is arranged in the tire cavity. A valve 3 having an cylindrical shape for injecting pressure from the outside of the tire to the inside thereof is provided in the wheel 2. The tire information acquisition device 10 is integrally fixed to the valve 3.

The tire information acquisition device 10 includes a housing 11 and a sensor unit substrate 12. The housing 11 has a hollow structure and houses the sensor unit substrate 12 inside the housing 11. The sensor unit substrate 12 is provided with a sensor 13 for acquiring tire information; and a power supply unit 14 for supplying electric power to the sensor 13. The power supply unit 14 and the sensor unit substrate 12 are connected by a wiring unit 12A disposed on the positive electrode side and the negative electrode side of the power supply unit 14 (see electrodes 14A in FIG. 2), and the power supply unit 14 is capable of supplying the electric power necessary for operation of the sensor 13 via the wiring unit 12A. In addition, the tire information acquisition device 10 further includes an antenna 15, a control circuit 16, and the like so that the tire information acquired by the sensor 13 may be transmitted to the outside of the tire.

As a material of the housing 11, a synthetic resin that transmits radio waves is used. On the other hand, examples of the tire information acquired by the sensor 13 may include the internal temperature and the internal pressure of the pneumatic tire 1. As the sensor 13, a temperature sensor or a pressure sensor is used to measure the internal temperature or the internal pressure. Alternatively, an acceleration sensor or a magnetic sensor may be used.

The housing 11 and the sensor 13 are provided with ventilation holes 11A and 13A, respectively, for ventilating the air in the tire cavity. These ventilation holes 11A and 13A are for improving the measurement accuracy of the sensor 13 that measures the internal temperature and internal pressure of the pneumatic tire 1. The ventilation hole 11A of the housing 11 and the ventilation hole 13A of the sensor 13 are preferably disposed at the same position in the tire width direction and/or the tire circumferential direction.

When fixing the sensor unit substrate 12 to the housing 11, it is possible, for example, to use a structure in which the housing 11 is separable into two parts, and the sensor unit board 12 is fixed by sandwiching the sensor unit substrate 12 by the pair of parts, or it is possible to use a structure in which there is the housing 11 having a bottomed cylindrical shape and a lid portion that fits into an opening portion of the housing 11, and the sensor unit substrate 12 is fixed by housing the sensor unit substrate 12 inside the housing 11 and closing the lid part.

In the tire information acquisition device described above, at least the periphery of the power supply unit 14 is covered with a heat-insulating material 20. In particular, the heat-insulating material 20 may be in a state of completely covering the periphery of the power supply unit 14 except for the wiring unit 12A; or in other words, preferably the heat-insulating material 20 is in a state of being in contact with the surface of the power supply unit 14 except for the wiring unit 12A. Accordingly, the heat-insulating effect of the heat-insulating material 20 may be sufficiently obtained while keeping an increase in weight due to the addition of the heat-insulating material 20 to a minimum. Examples of the material of the heat-insulating material 20 may include non-woven fabric and urethane foam. In order to suppress an excessive increase in weight, the heat-insulating material 20 preferably has a thickness of 3 mm or less and more preferably 2 mm or less.

The tire information acquisition device described above includes the sensor unit substrate 12 on which the sensor 13 for acquiring tire information and the power supply unit 14 for supplying electric power to the sensor 13 are disposed, and the heat-insulating material 20 is disposed at least a periphery of the power supply unit 14, so in the power supply unit 14, it is possible to suppress a temperature change due to the heat generation of the tire during traveling and a decrease in the temperature outside the tire. This makes it possible to extend the service life of the power supply unit 14 that is easily affected by heat.

In the tire information acquisition device, the sensor 13 is disposed outside the heat-insulating material 20. In other words, the periphery of the sensor 13 is not covered with the heat-insulating material 20. On the other hand, when the periphery of the sensor 13 is covered with the heat-insulating material 20, the sensor 13 may be affected by the heat-insulating effect of the heat-insulating material 20 and may not be able to accurately detect a temperature change inside the tire. Therefore, in a case in which the sensor unit substrate 12 includes a temperature sensor that measures the internal temperature of the tire, the sensor 13 is preferably disposed outside the heat-insulating material 20 so that the sensor 13 may accurately detect a temperature change inside the tire.

In the tire information acquisition device, the thermal conductivity of the heat-insulating material 20 at 20° C. is required to be 0.10 [W/m·K] or less, but is preferably 0.05 [W/m·K] or less, and more preferably is 0.03 [W/m·K] or less. By appropriately setting the thermal conductivity of the heat-insulating material 20 in this manner, it is possible to effectively suppress the temperature change of the portion covered with the heat-insulating material 20. For example, the thermal conductivity of rigid urethane foam is 0.02 to 0.04 [W/m·K]. On the other hand, the thermal conductivity of natural rubber is 0.13 [W/m·K], and the thermal conductivity of silicone rubber is 0.20 [W/m·K]. The natural rubber and silicone rubber do not constitute the heat-insulating material 20 in an embodiment of the present technology.

The heat-insulating material 20 is preferably a composite body of organic fibers and an inorganic porous material and more preferably is a composite body of polyester fibers and silica aerogel. When the heat-insulating material 20 is composed of a composite body of organic fibers and an inorganic porous material, the heat-insulating efficiency as a heat-insulating material is improved, so a temperature change may be suppressed with less heat-insulating material 20. Particularly, in a case of a composite body of polyester fiber and silica aerogel, the heat-insulating material 20 has a structure in which silica aerogel is dispersed in polyester fiber. More specifically, the polyester fiber has a network structure, and is a structure in which silica aerogel is dispersed and arranged for a plurality of network portions, so the pore size of silica aerogel becomes smaller than the mean free path of air, and heat transfer of air may be blocked. When the heat-insulating material 20 has a structure in which silica aerogel is dispersed in polyester fiber, the thermal conductivity of the heat-insulating material 20 at 20° C. is from 0.018 [W/m·K] to 0.024 [W/m·K]. The thickness of the heat-insulating material 20 may be reduced while lowering the thermal conductivity of the heat-insulating material 20 as described above, so an excellent effect of suppressing a temperature change may be obtained without increasing the dimensions of the heat-insulating material 20.

Figure 4:
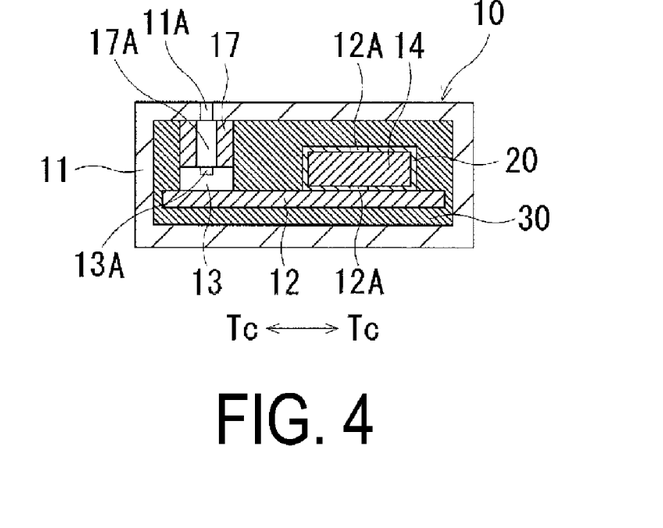
FIG. 4 is a cross-sectional view illustrating a modified example of an internal structure of a tire information acquisition device according to an embodiment of the present technology.

FIG. 4 illustrates a modified example of an internal structure of a tire information acquisition device according to an embodiment of the present technology. As illustrated in FIG. 4, the sensor unit substrate 12 is fixed to the housing 11 by a potting material 30. A packing 17 is disposed between the housing 11 and the sensor 13, and a ventilation hole 17A that communicates with the ventilation hole 11A and the ventilation hole 13A is provided at the center of the packing 17. By communicating these ventilation holes 11A, 13A, 17A, ventilation between of the tire cavity and the sensor 13 is secured. In this way, the sensor unit substrate 12 is fixed to the housing 11 by filling the inside of the housing 11 with the potting material 30 with the packing 17 sandwiched between the housing 11 and the sensor 13. A curable resin material may be used as the potting material 30, and examples thereof include urethane resin, epoxy resin, polyolefin resin, silicone resin, and fluorine resin.

Figure 5:
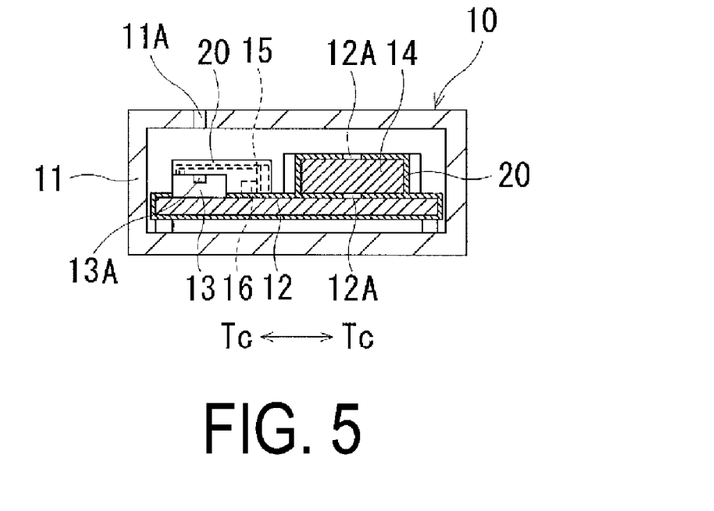
FIG. 5 is a cross-sectional view illustrating another modified example of an internal structure of a tire information acquisition device according to an embodiment of the present technology.

FIG. 5 illustrates another modification of an internal structure of a tire information acquisition device according to an embodiment of the present technology. In the embodiment in FIG. 2, a structure is illustrated in which the heat-insulating material 20 is disposed only at a periphery of the power supply unit 14; however, in the embodiment of FIG. 5, the heat-insulating material 20 is disposed so as to cover all of the electronic components except the sensor 13. In FIG. 5, only the sensor 13 is disposed outside the heat-insulating material 20, so the sensor 13 is not affected by the heat-insulating effect of the heat-insulating material 20. In a case of the tire information acquisition device 10 having the structure illustrated in FIG. 5, the degree of a temperature change in the electronic components may be reduced, so it is possible to cope with a wide range of temperature changes and possible to avoid using expensive electronic components because inexpensive electronic components may be used. Accordingly, the cost may be reduced while sufficiently ensuring the performance of the tire information acquisition device 10.

In the above description, an example is given in which a coin-type battery is used as the power supply unit 14; however, the power supply unit 14 is not limited to this, and an electret 22 (see FIG. 2) that generates electric power by changing the position of the electrode due to rotational movement or reciprocating movement may be used. In particular, since an electret 22 is highly responsive to rolling of the pneumatic tire 1, it is preferable to use an electret 22 that generates electric power by utilizing the position change of the electrode due to rotational movement. By employing a power generation method including an electret 22 as the power supply unit 14, the power supply unit 14 may generate electric power by utilizing rolling of the pneumatic tire 1, so electric power may be efficiently supplied to the sensor 13. Note that an electret 22 and a coin type battery may also be used in combination as the power supply unit 14.

Moreover, a structure in which the tire information acquisition device 10 is fixed to the valve 3 of the wheel 2 is described; however, the structure is not limited to this, and the tire information acquisition device 10 may be fixed to the inner surface of the tire. In this case, the tire information acquisition device 10 may be attached to the inner surface of the tire using a double-sided tape or an adhesive.

The tire information acquisition device 10 of the present technology may be applied to various pneumatic tires 1, but is preferably mounted on pneumatic tires 1 for trucks and buses. When mounted on the pneumatic tire 1 for a truck or bus, the effect of suppressing a temperature change in the power supply unit 14 is remarkable, and the service life of the power supply unit 14 may be effectively improved.

Example

Tire information acquisition devices of a Conventional Example and Examples 1 to 3 are made so as to have a sensor unit substrate on which a sensor for acquiring tire information and a power supply unit for supplying electric power to the sensor are disposed, and the presence or absence of a heat-insulating material, the material of the heat-insulating material, the thermal conductivity of the heat-insulating material, and the thickness of the heat-insulating material are set as indicated in Table 1.

In the Conventional Example and Examples 1 to 3, a coin-type battery is used as the power supply unit, and a silicone potting material (thermal conductivity: 0.20 [W/m·K]) is filled inside the tire information acquisition device. In addition, the heat-insulating material is not used in the Conventional Example, and in Examples 1 to 3, the heat-insulating material is disposed only at a periphery of the power supply unit. In Example 3, polyethylene terephthalate (PET) is used as the polyester fiber, which is the material of the heat-insulating material.

The service life of the battery of these tire information acquisition devices is evaluated by the following test method, and the results are also given in Table 1.

Figure 6:
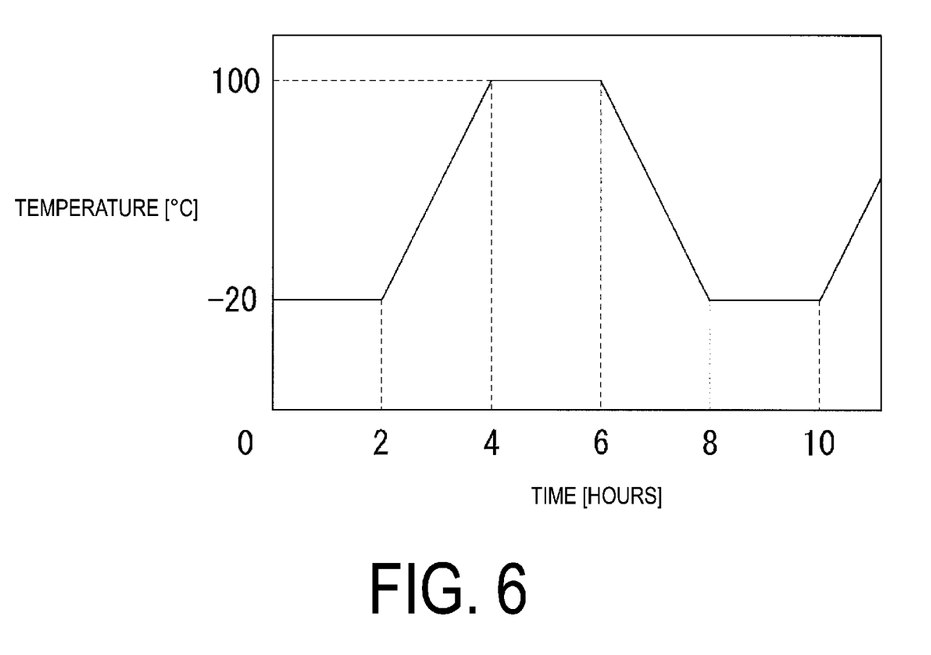
FIG. 6 is a graph illustrating a cycle of temperature change in evaluation of the service life of the battery.

Battery Service Life:

In the activated state of the sensor, the external temperature of the tire information acquisition device is periodically changed, and the number of days until the sensor stopped is measured. More specifically, as illustrated in FIG. 6, after being left at the initial temperature of −20° C. for 2 hours, the temperature is raised to 100° C. over 2 hours, and then after being left for 2 more hours at the temperature of 100° C., the temperature is lowered to −20° C. over 2 hours. As one complete cycle, this is repeated until the sensor stops. Evaluation results are expressed as index values with the value of the Conventional Example being defined as 100. Larger index values indicate a more excellent battery service life.

TABLE 1

|  | Conventional Example | Example 1 | Example 2 | Example 3 |
|---|---|---|---|---|
| Presence/absence of heat-insulating material | No | Yes | Yes | Yes |
| Material of heat-insulating material | — | Cellulose non-woven fabric | Rigid urethane foam | Polyester fiber and silica aerogel |
| Thermal conductivity of heat-insulating material [W/m · K] | — | 0.06 | 0.03 | 0.018 |
| Thickness of heat-insulating material (mm) | — | 1.0 | 1.0 | 1.0 |
| Battery service life | 100 | 115 | 150 | 190 |

As can be seen from Table 1, the tire information acquisition devices of Examples 1 to 3 have improved battery service life as compared with those of the Conventional Example.

The invention claimed is:

1. A tire information acquisition device, comprising
a sensor unit substrate on a same plane of which a sensor for acquiring tire information and a power supply unit for supplying electric power to the sensor are disposed;
a heat-insulating material being disposed at at least a periphery of the power supply unit; wherein
the power supply unit comprises an electret that generates electric power by changing a position of an electrode due to a rotational movement or a reciprocating movement.

2. The tire information acquisition device according to claim 1, wherein the sensor is disposed outside the heat-insulating material.

3. The tire information acquisition device according to claim 2, wherein a thermal conductivity of the heat-insulating material at 20° C. is 0.05 W/m·K or less.

4. The tire information acquisition device according to claim 3, wherein the heat-insulating material is a composite body of an organic fiber and an inorganic porous material.

5. The tire information acquisition device according to claim 4, wherein the heat-insulating material comprises a structure in which silica aerogel is dispersed in polyester fiber.

6. The tire information acquisition device according to claim 1, wherein a thermal conductivity of the heat-insulating material at 20° C. is 0.05 W/m·K or less.

7. The tire information acquisition device according to claim 1, wherein the heat-insulating material is a composite body of an organic fiber and an inorganic porous material.

8. The tire information acquisition device according to claim 1, wherein the heat-insulating material comprises a structure in which silica aerogel is dispersed in polyester fiber.

9. The tire information acquisition device according to claim 1, wherein the sensor is a pressure sensor, acceleration sensor or magnetic sensor.

10. The tire information acquisition device according to claim 1, further comprising a housing having two parts which fit together to enclose the sensor, the sensor unit substrate and the power supply unit, the housing being formed from a resin material.

\* \* \* \* \*